United States Patent [19]

Spainhour

[11] 4,395,020
[45] Jul. 26, 1983

[54] STRUT COMPRESSOR

[75] Inventor: Phillip A. Spainhour, Waukegan, Ill.

[73] Assignee: Ammco Tools, Inc., North Chicago, Ill.

[21] Appl. No.: 358,204

[22] Filed: Mar. 15, 1982

[51] Int. Cl.³ .............................................. B23P 19/04
[52] U.S. Cl. ....................................... 254/10.5; 29/227
[58] Field of Search ................. 254/10.5; 29/215–218, 29/225, 227, 251, 252

[56] References Cited

U.S. PATENT DOCUMENTS

| | | | |
|---|---|---|---|
| 1,425,796 | 8/1922 | Salsgiver | 254/10.5 |
| 1,428,566 | 9/1922 | Timmerman | 29/215 |
| 2,485,022 | 10/1949 | Taylor | 29/251 |
| 2,789,342 | 4/1957 | Pouell | 254/10.5 |
| 3,067,500 | 12/1962 | Bliss | 254/10.5 |
| 3,384,348 | 5/1968 | Wicker | 254/10.5 |
| 3,902,698 | 9/1975 | Furrer et al. | 254/10.5 |
| 3,912,224 | 10/1975 | Castoe | 254/10.5 |
| 4,034,960 | 7/1977 | Kloster | 254/10.5 |
| 4,061,308 | 12/1977 | Ghent | 254/10.5 |
| 4,262,515 | 4/1981 | Frei | 254/10.5 |

Primary Examiner—Robert C. Watson
Attorney, Agent, or Firm—Edmond T. Patnaude

[57] ABSTRACT

A spring compressor employs a fluid-operated piston-cylinder which drives a first platen toward a second platen to compress a MacPherson strut mounted between the two platens, the first platen being pivotally mounted for self-adjustment to accommodate many different strut sizes and designs.

7 Claims, 5 Drawing Figures

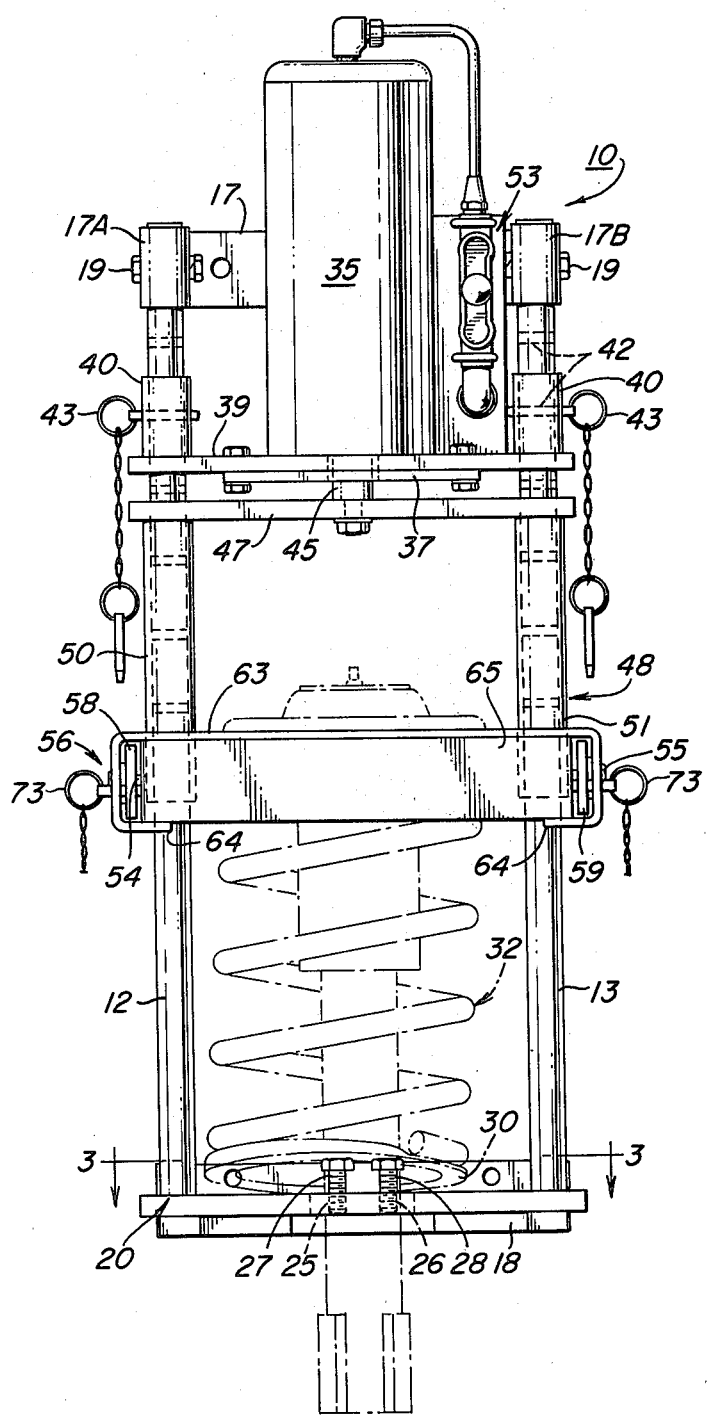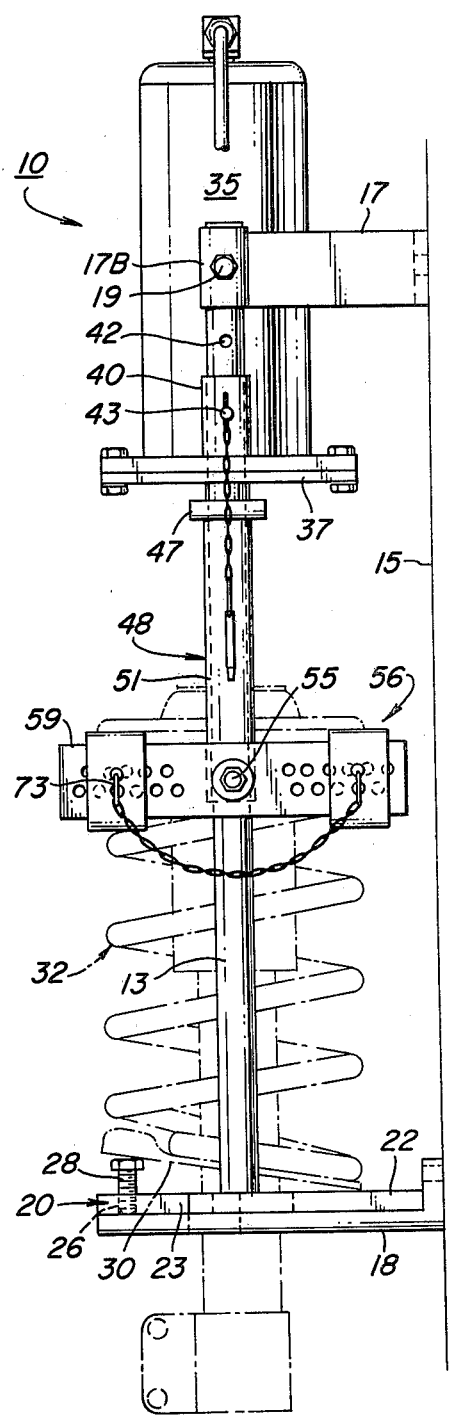

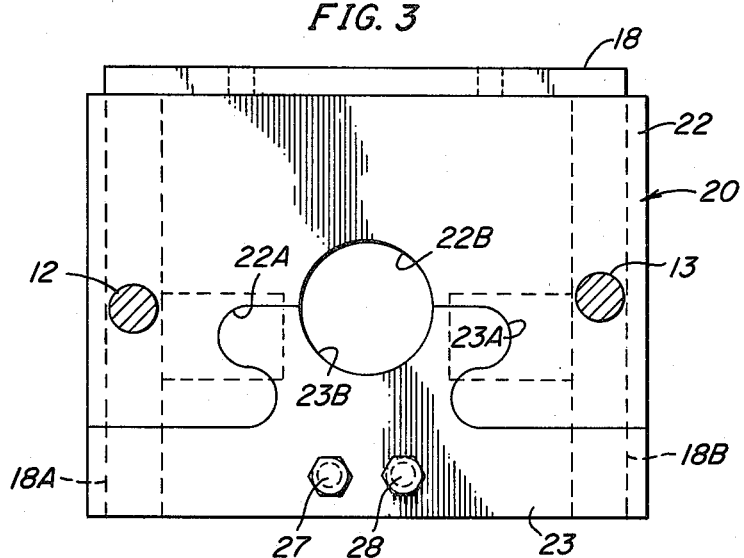
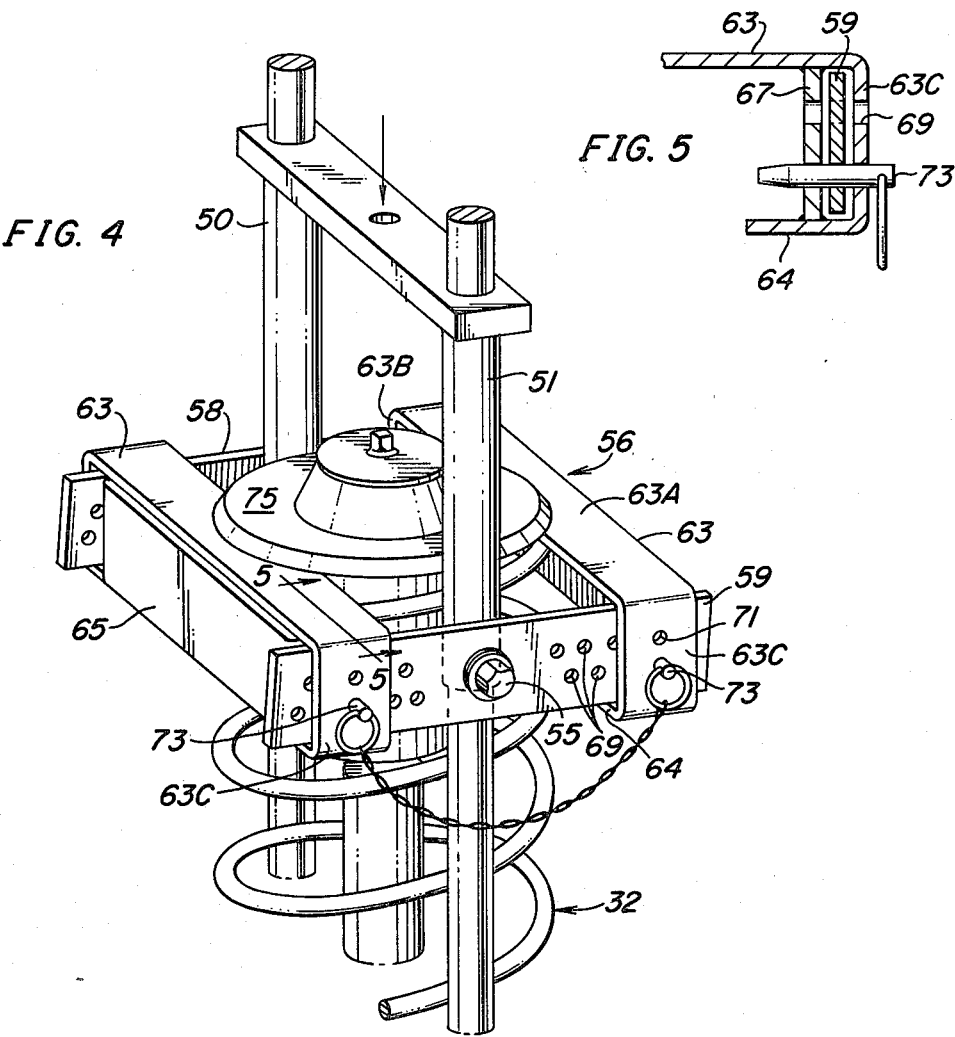

STRUT COMPRESSOR

The present invention relates in general to a device for controlling the compression of a spring-loaded device, and it relates in particular to a new and improved MacPherson strut compressor which employs a fluid operated piston-cylinder and a platen which is longitudinally moved toward and away from a fixed platen to compress and control decompression of the spring of a MacPherson strut positioned between the two platens.

BACKGROUND OF THE INVENTION

U.S. Pat. No. 4,295,634, assigned to the assignee of the present invention, describes a device for use in controlling the compression of the spring of a MacPherson strut during disassembly and subsequent reassembly of the strut. In that device a first platen is moved along a pair of rails toward and away from a fixed platen. The movable platen moves in a direction perpendicular to its principal plane and includes a plurality of standoffs which engage the head of the strut.

There has recently been introduced in the marketplace a MacPherson strut wherein the longitudinal axis of the strut is transverse to the longitudinal axis of the coil spring which surrounds it. When the compressor described in the said patent is used with this type of strut the movable platen moves parallel to the strut axis, but in a direction transverse to the spring axis. As a result, the strut mounted parts bind against the spring. Moreover, since the head of the strut fits against the upper end of the strut spring, its upper face is generally disposed at a small angle relative to the plane of the movable platen, and due to the compression of the spring this angle changes as the platen moves downwardly along the strut axis.

SUMMARY OF THE INVENTION

Briefly, there is provided in accordance with the present invention a new and improved tool for use in safely disassembling and reassembling spring-loaded struts of the type known as MacPherson struts. This tool is an improvement over the strut compressor described in U.S. Pat. No. 4,295,634 and includes, inter alia, a novel platen assembly which is mounted for free pivotal movement about an axis extending perpendicularly to the axis along which the platen is moved by the piston-cylinder device. The platen assembly includes adjustably movable safety jaws which are positionable over and directly against the spring below the head of the strut. These jaws are also pivotable relative to the platen whereby to self-adjust to the angle of the coil of the spring against which they abut. Also, the jaws have depending safety flanges which prevent a compressed spring from being accidentially released from the compressor after the strut has been removed from the center of the spring.

GENERAL DESCRIPTION OF THE DRAWINGS

The present invention will be better understood by a reading of the following detailed description taken in connection with the accompanying drawings wherein:

FIG. 1 is a front elevational view of a strut compressor embodying the present invention, a MacPherson type strut being shown in phantom in the compressor;

FIG. 2 is a side elevational view of the strut compresor shown in FIG. 1;

FIG. 3 is a sectional view of the compressor of FIG. 1 taken along the line 3—3 and particularly showing the top face of the fixed lower platen;

FIG. 4 is a perspective view of the upper platen of the strut compressor shown in FIG. 1 in use; and FIG. 5 is a cross-sectional view taken along the line 5—5 of FIG. 4.

DETAILED DESCRIPTION OF A PREFERRED EMBODIMENT OF THE INVENTION

Referring particularly to FIGS. 1 and 2, a strut compressor 10 embodying the present invention comprises a pair of upright support rails 12 and 13 which are adapted to be mounted to a wall 15 by means of upper and lower U-shaped brackets 17 and 18 respectively. The lower bracket 18 is welded to the rails 12 and 13 and the upper bracket is provided with tubular parts 17A and 17B which receive the rails 12 and 13. The rails are secured to the tubes 17A and 17B by means of a nut and bolt assemblies 19. The brackets thus hold the rails in fixed, mutually parallel relationship.

A lower platen assembly 20 is disposed directly against the top face of the bracket 18, and is welded to the rails 12 and 13. The lower platen assembly 20 is best shown in FIG. 3 and comprises a rear platen part 22, which is affixed to the rails 12 and 13, and a forward platen part 23 which rests on the arms 18A and 18B of the bracket 18. The platen parts 22 and 23 have complimentary mating surfaces 22A and 23A which removably interlock them together. It may be seen that the platen parts 22 and 23 have hemispherical matching edge portions 22B and 23B which define a cylindrical opening through the center of the lower platen assembly when the parts 22 and 23 are in assembled, interlocked relationship. The shock absorber portion of the strut being compressed extends freely through this opening as shown in FIGS. 1 and 2.

The platen part 23 includes a pair of tapped bores 25 and 26 which receive a pair of standoff bolts 27 and 28 which, as more fully explained hereinafter, provide vertically adjustable upper surfaces for engagement with the lower surface of an angularly disposed lower spring plate 30 of a MacPherson strut 32 mounted in the strut compressor 10. When the compressor 10 is used with a strut having a lower plate which is perpendicular to the longitudinal axis of the strut the foreward platen part 23 may be inverted (not shown) so that the bolts 27, 28 extend downwardly out of engagement with the strut wherefor the lower spring plate of the strut will rest directly on both of the lower platen parts 22 and 23.

The cylinder 35 of a pneumatic piston-cylinder drive includes a mounting flange 37 which is mounted to the bottom face of a support plate 39. A pair of guide sleeves 40 are welded to the support plate 39 and are slidably disposed on the rails 12 and 13 for vertical adjustment thereon. The sleeves are provided with transverse holes which may be aligned with selected ones of a plurality of transverse holes 42 in the rails 12 and 13 for receiving locking pins 43 which hold the support plate in the adjusted position.

The piston-cylinder assembly 35 includes a piston rod 45 which is secured to the push-bar 47 of a push-bar assembly 48 slidably mounted for vertical movement along the rails 12 and 13. The push-bar assembly 48 further includes a pair of elongated guide sleeves 50 and 51 which are slidably disposed over the rails 12 and 13 and fixedly secured as by welding to the push-bar 47. It may thus be seen that when the cylinder 35 is pressurized by opening a valve 53 connected in a pneumatic line between the cylinder 35 and a source of air under pressure the push bar assembly is driven down along the rails 12 and 13.

In accordance with an important aspect of the present invention, a movable platen assembly 56 is mounted to the push-bar assembly for pivotal movement about a horizontal axis extending through the central longitudinal axes of the rails 12 and 13. More particularly and with reference to FIGS. 1 and 4, it may be seen that the platen assembly 56 is mounted to the sleeves 50 and 51 by a pair of pivot pin assemblies 54 and 55 each including a hex cap nut.

The platen assembly 56 comprises a pair of pivot bars 58 and 59 which are centrally apertured to receive the pivot assemblies 54 and 55 and front and rear spring engaging slides 63. The slides 63 each comprises a central body portion 63A and depending end flanges 63B and 63C which respectively overlie the outer faces of the pivot bars 58 and 59. The flanges 63B and 63C are provided at the bottom with reentrant lips 64 which extend below the pivot bars 58 and 59. A safety shield 65 has inturned outer ends to provide end flanges 67 lying parallel to and spaced from the flanges 63B and 63C to provide rectangular openings through which the pivot bars 58 and 59 loosely extend. The shields 65 are welded to the associated slides 63 at the top and bottom edges of the flanges 67 to provide strong integral members.

The pivot bars 58 and 59 are identical, and as best shown in FIG. 4 includes two rows of holes 69 at each end for alignment with either the upper or lower ones of a plurality of holes 71 in the flanges 63B and 63C of the slides 63. One pair of locking pins 73 is provided for each side of the platen assembly and they pivotably attach the slides 63 at the selected positions to the pivot bars 58 and 59 in a sufficiently loose manner to permit the slides 63 to be slid into the MacPherson strut 30 between the top cap 75 thereof and the upper coil of the spring 32. When the piston-cylinder is subsequently pressurized, the platen assembly 56 as well as the slides 63 thereof self-adjust to the optimum position for maximizing the area of engagement between the slides 63 and the spring 32 as the platen assembly moves down along the rails. In this manner, the upper end of the spring 32 is not forced laterally into engagement with the central shock absorber portion of the strut even where the axis of the spring is disposed at a substantial angle relative to the axis of the shock absorber.

While the present invention has been described in connection with a particular embodiment thereof, it will be understood by those skilled in the art that many changes and modifications may be made without departing from the true spirit and scope of of the present invention. Therefore, it is intended by the appended claims to cover all such changes and modifications which come within the true spirit and scope of this invention.

What is claimed:

1. Apparatus for use in assembling and disassembling a strut assembly of the type having a shock absorber axially disposed within a coil spring, comprising in combination a plurality of mutually parallel support rails, first platen means mounted at a fixed position on said support rails for operatively engaging one end of a coil spring disposed between said rails in substantial parallelism therewith, second platen means mounted for movement along said rails for engaging the other end of said coil spring, and means for applying a force to said second platen means to move said second platen means toward said first platen means to compress said coil spring between said first and second platens, said second platen means comprising first and second pivot members freely pivotable about an axis extending transversely to the longitudinal axes of said rails, and front and rear spring engaging slides adjustably mounted to said pivot members and extending therebetween for engaging said other end of said coil spring.

2. Apparatus according to claim 1 wherein said first platen means comprises a plurality of spring engaging surfaces independently adjustable toward and away from said second platen means.

3. Apparatus according to claim 2 wherein said surfaces are provided on a plurality of threaded members respectively received in threaded holes in said first platen.

4. Apparatus according to claim 1 wherein said front and rear slides are pivotably mounted to said pivot members.

5. Apparatus according to claim 1 wherein at least one of said slides comprises depending flange means providing a safety shield to prevent the coil spring of a strut assembly compressed between said first and second platens from being inadvertently released from said apparatus.

6. Apparatus according to claim 5 wherein said slides respectively comprise a pair of end flanges depending over the outer faces of said pivot members, said end flanges and said pivot members being provided with transverse holes for mutual alignment and receipt of removable locking pins.

7. Apparatus according to claim 6 wherein said slides respectively comprise a plurality of reentrant lips respectively located at the distal ends of said end flanges.

* * * * *